United States Patent
Talamo et al.

(10) Patent No.: US 8,918,849 B2
(45) Date of Patent: Dec. 23, 2014

(54) SECURE USER CREDENTIAL CONTROL

(75) Inventors: Maurizio Talamo, Rome (IT); Franco Arcieri, Rome (IT); Guido Maria Marinelli, Rome (IT); Christian H. Schunck, Rome (IT)

(73) Assignee: Konvax Corporation, Cambridge, MA (US)

( * ) Notice: Subject to any disclaimer, the term of this patent is extended or adjusted under 35 U.S.C. 154(b) by 496 days.

(21) Appl. No.: 13/106,245

(22) Filed: May 12, 2011

(65) Prior Publication Data

US 2012/0291108 A1 Nov. 15, 2012

(51) Int. Cl.
*H04L 29/06* (2006.01)
*H04L 9/32* (2006.01)
*G06F 21/36* (2013.01)

(52) U.S. Cl.
CPC .............. *H04L 9/3273* (2013.01); *G06F 21/36* (2013.01); *G06F 2221/2133* (2013.01)
USPC .......................................................... 726/6

(58) Field of Classification Search
USPC .......................................................... 726/6
See application file for complete search history.

(56) References Cited

U.S. PATENT DOCUMENTS

| | | | | |
|---|---|---|---|---|
| 6,006,333 | A * | 12/1999 | Nielsen | 726/8 |
| 6,263,446 | B1 * | 7/2001 | Kausik et al. | 726/5 |
| 7,661,128 | B2 * | 2/2010 | Chen et al. | 726/5 |
| 2001/0034837 | A1 * | 10/2001 | Kausik et al. | 713/185 |
| 2002/0087890 | A1 | 7/2002 | Chan et al. | |
| 2002/0188872 | A1 | 12/2002 | Willeby | |
| 2004/0003258 | A1 | 1/2004 | Billingsley et al. | |
| 2004/0049444 | A1 * | 3/2004 | Sato | 705/37 |
| 2006/0020812 | A1 * | 1/2006 | Steinberg et al. | 713/181 |
| 2006/0080545 | A1 | 4/2006 | Bagley | |
| 2006/0200664 | A1 * | 9/2006 | Whitehead et al. | 713/165 |
| 2006/0206919 | A1 | 9/2006 | Montgomery et al. | |
| 2006/0225130 | A1 * | 10/2006 | Chen et al. | 726/5 |
| 2007/0005500 | A1 | 1/2007 | Steeves et al. | |
| 2007/0043748 | A1 * | 2/2007 | Bhalotia et al. | 707/101 |
| 2007/0244831 | A1 * | 10/2007 | Kuo | 705/67 |
| 2007/0245407 | A1 * | 10/2007 | Lester et al. | 726/5 |
| 2007/0271465 | A1 | 11/2007 | Wu | |
| 2008/0028444 | A1 * | 1/2008 | Loesch et al. | 726/4 |

(Continued)

FOREIGN PATENT DOCUMENTS

| | | |
|---|---|---|
| GB | 2349960 | 11/2000 |
| WO | 2005/083638 | 9/2005 |

OTHER PUBLICATIONS

Dunphy et al.; A closer look at recognition-based graphical passwords on mobile devices; Published in: Proceeding SOUPS '10 Proceedings of the Sixth Symposium on Usable Privacy and Security; Article No. 3; ACM New York, NY, USA; 2010; ACM Digital Library.*

(Continued)

*Primary Examiner* — Bradley Holder
(74) *Attorney, Agent, or Firm* — Occhiuti & Rohlicek LLP (57) ABSTRACT

In some embodiments, a user has use a single universal text— or image-based secret for generating a service-provider specific identity credential, for example username plus password, for authentication is derived. A human (i.e., the user) must interpret an image to enter this universal text (or image) based secret. For example, an image based challenge is presented to the user, and a credential is obtained based on the user's response to the challenge.

18 Claims, 4 Drawing Sheets

(56) References Cited

U.S. PATENT DOCUMENTS

| | | | |
|---|---|---|---|
| 2008/0072293 A1* | 3/2008 | D'Urso | 726/4 |
| 2009/0119757 A1* | 5/2009 | Acuna et al. | 726/5 |
| 2009/0165104 A1 | 6/2009 | Danielsen et al. | |
| 2009/0191846 A1* | 7/2009 | Shi | 455/411 |
| 2009/0260077 A1 | 10/2009 | Zhu et al. | |
| 2010/0120396 A1* | 5/2010 | Faith et al. | 455/410 |
| 2010/0215270 A1 | 8/2010 | Manohar et al. | |
| 2010/0306840 A1* | 12/2010 | Yoshida | 726/9 |
| 2011/0030043 A1* | 2/2011 | Jones et al. | 726/7 |
| 2011/0093820 A1* | 4/2011 | Zhang et al. | 715/863 |
| 2012/0102552 A1* | 4/2012 | Sammon et al. | 726/5 |
| 2012/0226815 A1* | 9/2012 | Goodman et al. | 709/228 |
| 2012/0226981 A1* | 9/2012 | Clavin | 715/719 |
| 2012/0260326 A1* | 10/2012 | Steigmann | 726/7 |
| 2012/0287487 A1* | 11/2012 | Nagarajan | 358/505 |

OTHER PUBLICATIONS

Chiasson et al.; Multiple password interference in text passwords and click-based graphical passwords; Published in: Proceeding CCS '09 Proceedings of the 16th ACM conference on Computer and communications security; pp. 500-511; ACM New York, NY, USA; 2009; ACM Digital Library.*

* cited by examiner

FIG. 4

SECURE USER CREDENTIAL CONTROL

BACKGROUND

This invention relates to secure control of user credentials, and in particular, relates to security based on image-based generation of credentials.

Management of user identifiers and passwords in cyberspace has become a major vulnerability of computer based systems and has become one of the major issues in countering cybercrime and breaches of commercial online systems. In April 2011, the U.S. Whitehouse issued a report titled "National Strategies for Trusted Identities in Cyberspace," which discusses a number of open issues that must be addressed to create a secure and privacy conserving ecosystem for digital identities.

One major issue in cyberspace today is that users of computer and network based services must manage a myriad of passwords to gain access to those services. For example, a user may have a different password for each online account (e.g., banking, shopping, etc.). Each service provider may have different rules for the passwords, for example, requiring a minimum number of characters, use of special characters, frequency of change, etc. The user may also provide a different identity to different service providers, for example, by providing a user-selected username or alias by which the user is identified by the provider. Such identifiers in combination with a password (or another form of shared secret) form identity credentials that the user presents to the service provider for access. From the user's perspective, the increasing complexity and risk of managing multiple credentials threaten the convenience associated with online transactions. These factors also impart an increased risk of account compromise through insecure user management of account credentials and an increased likelihood of account abandonment.

One solution to the above mentioned problem is a so-called password vault where service provider specific passwords are stored. The vault is protected by a "master" password which is in the possession of the user. Using this password the user can access or give applications access to the other passwords stored in the vault.

Some systems improve security by requiring that separately from providing a username and password, the user respond to an image-based CAPTCHA ("Completely Automated Public Turing test to tell Computers and Humans Apart") to inhibit computer-based password guessing attacks. Some systems have used graphical passwords in which a user remembers an image, and authentication of the user by a server involves providing a set of images for display to the user, and then determining whether the user selected the same image.

SUMMARY

In one aspect, in general, one or more embodiments described in this document allow a user to use a single (universal) text- or image-based secret to generate a recipient-specific random (e.g., pseudo-random) number and deriving from it a robust, recipient specific credential ("token"), for example representing but not limited to a username and/or password and/or other identifying (e.g., serial number MAC address) or verifying (e.g., PIN) information, for authentication or verification. In some examples, a human (i.e., the user) must interpret an image to enter this universal text (or image) based secret. For example, an image based challenge is presented to the user, and a pseudo-random number is obtained based on the user's response to the challenge.

In some versions, the infrastructure needed for the image-based challenges is provided by an external server (in some examples referred to as an "external authority" or a "validation server") without burdening the systems seeking to authenticate the user (e.g., the service providers). This is done without the universal secret being known to the external server. Possible implementation alternatives include: 1) the external server does not know the user's service provider specific credentials; and 2) the external server is authorized from the user to present the service provider specific credentials to the service provider In some implementations the approach can provide proof to a recipient (e.g., to a service provider) that the user answered correctly to an image-based challenge. Such a proof can also be used by the service provider to generate a new credential for the user.

In another aspect, in general, a service-provider specific credential is generated based on a user's secret. The method includes providing a challenge to the user, and accepting a response from the user determined by the user based on the user's secret and the challenge. An identifier of a service provider is determined, and a credential-generating procedure is applied to combine the response from the user and the identifier for the service provider to form the service-provider specific credential. The service-provider specific credential is provided for transmission to the service provider without providing information sufficient to determine the user's secret in the transmission.

In another aspect, in general, a method is directed to generating a recipient-service-provider specific (e.g., service-provider specific) credential based on a user's secret using a computing device of the user. An image-based challenge (e.g., based on image data) is provided to the user, for instance, for presentation to the user on an electronic display (e.g., a graphical touchscreen). The challenge comprises a spatial arrangement of a set of perceptually obscured symbols. A response is accepted from the user who determined the response based on the user's secret and the challenge and entered the response using an input device (e.g., a stylus, touchscreen). The response is based on or represents a sequence of locations in the spatial arrangement. A computer implemented credential-generating procedure is applied to combine the response from the user, an identifier of the recipienta service provider, and a user-specific random number access from a data storage to form the recipient-service-provider specific credential, which may be as a pseudo-random number, and which is provided for transmission to the recipient (e.g., service provider over a data communication link) without providing information sufficient to determine the user's secret from the transmission.

In another aspect, in general, a method for repeatedly soliciting credentials from a user includes, on each of a sequence of repetitions, externally to the computing device of the user, generating a different image-based challenge. The challenge comprises a spatial arrangement of a set of perceptually obscured symbols. A map corresponding to the spatial arrangement of the symbols is also generated, and the challenge and corresponding mapping data are provided over a secure communication link to the computing device of the user for presentation to the user and for soliciting a sequence of locations in the spatial arrangement. The mapping data provides a relationship between the spatial arrangements of the symbols in the plurality of repetitions.

In another aspect, in general, an image-based method for verifying a user response includes providing a first image-based challenge to the user and accepting a first response to the first challenge from the user, including generating a first sequence (for instance, a first pseudo-random number) representing the user's response. Subsequently a second image-based challenge is provided to the user and a second response to the second challenge is accepted, including generating a second sequence (for instance, a second pseudo-random number) representing the user's response. Equality of the first sequence and the second sequence serves as a proof that the second user is a human and that the second user knew the first user's first response to the first challenge (e.g., that the first user and the second user are the same user). In some examples, the steps of presenting the second image-based challenge and accepting the second response are performed as part of performing a credential generating procedure. In some examples, the method includes providing the proof for unlocking a secured physical device (e.g., a door) and/or a software application.

One or more aspects of the approach can include one or more of the following features in combination.

Providing the challenge to the user includes providing challenge information required to be processed by the human in determining the response.

Determining the response based on the user's secret and the challenge requires human processing of the challenge.

Applying the credential-generating procedure includes selecting portions of a user's fixed random number and combining the selected portions.

Combining the selected portions includes applying a reduction function to each portion and combining the reduced portions.

The selected portions of the user's random number form less than $1/1,000$ of said random number, and preferably less than $1/10,000$ of said random number.

The credential-generating procedure is applicable to the response from the user with any of a plurality of identifiers for a plurality of service providers to form a different service-provider specific credential for each of said service providers.

The service-provider specific credential comprises a password associated with the user and the service provider.

The service-provider specific credential comprises at least one of a name, preferably a user name, a mail address (e.g., electronic mail address), and a Uniform Resource Locator (URL).

The credential includes an identity attribute, for example, a birthdate, in association with the user's identity.

The response is determined based on the user's secret and the challenge requires human processing of the challenge.

Determining the user's secret from the user's response requires human processing of the challenge.

Providing the challenge to the user includes providing image data for presentation to the user.

The image data represents a spatial arrangement of a plurality of symbols from an alphabet of symbols.

In some implementations the user chooses the alphabet of symbols as a subset of symbols from a large variety of symbols, logos, images, and alphanumeric characters in various alphabets.

The spatial arrangement of symbols that is provided to the user always contains the complete, previously selected subset of symbols, but may contain additional different symbols that change from time to time. In some embodiments the same symbols may appear several times in one image.

The spatial arrangement comprises a perceptual obscured spatial arrangement of the plurality of symbols.

The perceptually obscured arrangement of symbols includes at least one of spatially distorted symbols, overwritten symbols, and overlapping symbols.

The spatial arrangement comprises a grid based arrangement.

The spatial arrangement comprises an irregular two-dimensional arrangement, preferably including at least some overlapping of perceptually obscured representations of multiple of the symbols.

The alphabet of symbols comprises a set of characters from a character set, or some other set of predefined images (e.g., logos, etc.).

The character set comprises a set of alphabetic and/or numeric characters.

Accepting the response from the user includes accepting a set of selections from the challenge.

Accepting the set of selections includes accepting a sequence of selections.

The set of selections comprises a set (e.g., a sequence) of spatial locations in an image represented by the challenge.

The sequence of spatial locations comprises a sequence of grid locations.

The spatial locations are mapped to a set of regions in the image.

The image based challenge is generated and presented to the user from an external server. To get access to this service the user registers with this external server. The registration can be anonymous. In some implementations the user declares his universal token explicitly (for example to allow recovery in case of memory loss).

Applying the credential generating procedure includes selecting a service provider specific function according to the identifier of the service provider, and then applying the service provider specific function to an argument determined from the response from the user.

Applying the credential-generating procedure includes accessing a set of values associated with locations in the challenge, and then combining the response from the user and the set of values in forming the service provider specific credential.

Each location is associated with a sequence of the values, and wherein combining the response and the values comprises for each element in a sequence of locations in the response, selecting a corresponding value in the sequence of values associated with that location.

The set of value associated with the locations is updated to conform to a change in the user's secret such that a subsequent application of the credential-generating procedure yields the same service-provider specific credential based on a subsequent response from the user based on the changed secret.

The challenge and associated mapping data is received from an external server.

If the challenge and associated mapping is received from an external server the user registers with this external server. This can be done anonymously by establishing a unique username/nickname (for the domain of this external server). The server then dispatches a software (user agent) to the user's computing devices (including smartphones etc.).

Applying the credential generating procedure further comprises combining the mapping data with the response from the user to determine a mapped response Combining the response from the user and the identifier for the service provider comprises combining the mapped response and the identifier for the service provider.

The steps set forth above are repeatable using a plurality of different challenges to the user yielding a plurality of different responses from the user determined by using the same user's secret such that the service-provider specific credential remains the same for each repetition.

Each of the plurality of challenges represents a different perceptual obscured spatial arrangement of a plurality of symbols from an alphabet of symbols.

In another aspect, in general, software stored on a computer readable medium comprising instructions for causing a data processing system to perform any combination of steps set forth above.

In another aspect, in general, a system is configured to perform any combination of steps set forth above.

Aspects may have one or more of the following advantages.

A number of advantages relate to the problem of providing security for the user, for example, by making it more difficult for adversaries to compromise online transactions. Some specific examples of such advantages include the following.

Providing a credential (e.g., a domain plus a secret) entry approach that requires a human to respond to a challenge to prove its identity makes it difficult or impossible for a machine-based attack to be successful or efficient.

It is hard for malicious software to obtain the universal secret since it is not stored on any computing device at any time and it is not disclosed to the external server or the service provider.

The service provider specific credentials are very robust since they are derived from pseudorandom numbers.

The user has to protect only one secret.

Even if the user's secret is compromised an adversary cannot derive the service provider specific credentials.

The user can change his secret anytime (even after each use) without affecting the service provider specific credentials.

The secret part of the service provider specific credentials can be changed while the user keeps his secret.

In order to obtain the service provider specific credential it is necessary to get hold of the secret, the service provider specific pseudorandom number and the specific algorithm to derive the service provider specific credential. Without any of these three "ingredients" it is very hard to obtain the service provider specific credential These three items (secret, the pseudorandom number and the algorithm) are stored in different places. Moreover the service-provider specific credentials are only stored on the servers of the respective service provider. For each use the service-provider specific credentials are calculated again by the software agent (based on the user's input, the pseudorandom number and the algorithm)

The user generates a pseudo-random number. An adversary that is not in possession of the mapping function between grid locations and pseudorandom number parts cannot map the pseudorandom number back to grid locations.

As the user enters a sequence of symbols already known to him, the CAPTCHA symbols can be made more demanding for the human to recognize than in a scheme where the user has to recognize a sequence of symbols that is new/unknown to him. Therefore there is the potential to increase the difficulty of the underlying AI problem The approaches provide a strong defense again key-logging attacks, at least in part because the inputs are locations on a grid as opposed to key presses on a keyboard.

A number of advantages relate to efficiency based on convenience for individuals who may choose to manage fewer passwords or accounts than they do today. Some specific examples of such advantages include the following.

It is easier for the user to protect a single secret based on which the service-provider specific pseudorandom numbers can be generated (from which the robust, service-provider specific credentials are derived).

The user can change his secret frequently (at any time he wants) without changing the service provider specific credentials The user proves in a single action both that he is human and that he knows the credential for the server.

The same infrastructure can be provided to the user for use with many different servers, without adding additional burden on the external server and the user.

Even if all the passwords from a set of service providers are compromised, and even if further the user's computer is compromised, an adversary does not have enough information to determine the user's universal secret or to generate credentials for other service providers.

A number of advantages relate to ease of use by automating identity solutions whenever possible and basing them on technology that is easy to operate with minimal training. Some specific examples of such advantages include the following.

Remembering only a single secret a user can generate the service-provider specific pseudorandom numbers from which the robust, service-provider specific credentials are derived.

The user proves in a single action both that he is human and that he knows the credentials for the server.

The user entry of his secret is solely (touch) screen based, or uses a pointing device like a mouse. Therefore no keypad is required. This makes this approach not only suitable for use on standard computers but also only touch and pointing based computing devices like some smartphones and tablet computers.

Making this approach suitable for smartphone use with small screen can include implementing image browsing features, such as display of only part of the image, zoom, touching the same symbol x times in a row tells the system that this symbol corresponds to the xth symbol in the universal password.

The user automatically generates robust credentials without the burden and complexity to evaluate or compute complex alphanumeric patterns (i.e. the user does not need to make many attempts to create a credential that is sufficiently strong).

For the user it is easier to recognize the CAPTCHA symbols as they correspond to its secret, as compared to recognizing a previously unseen word or phrase.

The credential entry is a single interaction that both proves that a human entered the secret and that the user knew the secret, as compared to using two separate interactions and/or mechanisms to prove these two aspects.

A number of advantages relate to confidence that digital identities are adequately protected, thereby increasing the use of the Internet for various types of online transactions. Some specific examples of such advantages include the following.

The user increases his confidence in using online transactions, because he is ensured that his credentials are strong and well protected.

Increased privacy for individuals, who rely on their data being handled responsibly and who are routinely informed about those who are collecting their data and the purposes for which it is being used.

The user can easily generate multiple credentials (for example email-addresses plus password) to exchange information with many different servers avoiding that data used in different service provider transactions are being linked based on the use of the same part of a credential (email-address) with these service providers.

The user can easily classify the service providers in different categories so that the service provider specific identifiers are searchable using keywords. The user can have a different universal secret for each category.

In some versions of the invention the separation of tasks between user and external server leads to an increased protection of the user's service provider specific credentials. Only the combination of the user's universal secret and of the image and corresponding map provided by the external server allow the re-generation of the user's service provider specific credential. There is some analogy to the protection of safe deposit boxes in banks where two keys (the customer's and the bank's) are required for access. In such a scenario a user who's universal secret and computing devices have been compromised can request the external server not to provide further images and maps or to continue to provide the images but with incorrect maps.

Other features and advantages of the invention are apparent from the following description, and from the claims.

NOTATION

The following notation is generally followed in the Description below.

U: a user that is providing the credential.
S: a Service provider to which the User is providing a service provider specific credential
$S_{Prov}$: an identifier for the service provider, for example, a random number that is unique to the service provider
$CT_{RP}$: a secret credential (or "identifying credential") being provided by the user to the service provider.
$T_U$: a secret ("universal token") in the mind of the User
R: a random number that is specific to the User (more precisely, this may be referred to as $R_U$), which may be generated to be a cryptographically strong "book of random numbers" that is used by functions at the user's computer.
$I_j$ and $M_j$: a corresponding pair of an image and a map, respectively. The map provides a function from a domain of locations (e.g., x-y coordinates) in the image to a range of indices (e.g., integers).
A: an external server or other entity/module (e.g. validation authority, CAPTCHA server) that generates the corresponding image/map pairs.
$L_j=(l_1, l_2, \ldots, l_k)$: a sequence of locations selected by the user in the image $I_j$.
$Q=(q_1, \ldots, q_k)=M_j(L_j)$: a corresponding sequence of mapped indices.
P: a translation of the sequence of mapped indices Q.
$S_{RP}=W_S(R, P, S_{Prov})$: a sequence of subsequences of R obtained by applying a function $W_S$ to R, P, and $S_{Prov}$.
$F_{RS}$: a service provider specific logical function generated using R.
$CT_{RP}=F_{RS}(S_{RP})$: $F_{RS}$ applied to a single subsequence of $S_{RP}$

DESCRIPTION

1 Overview

Figure 1:
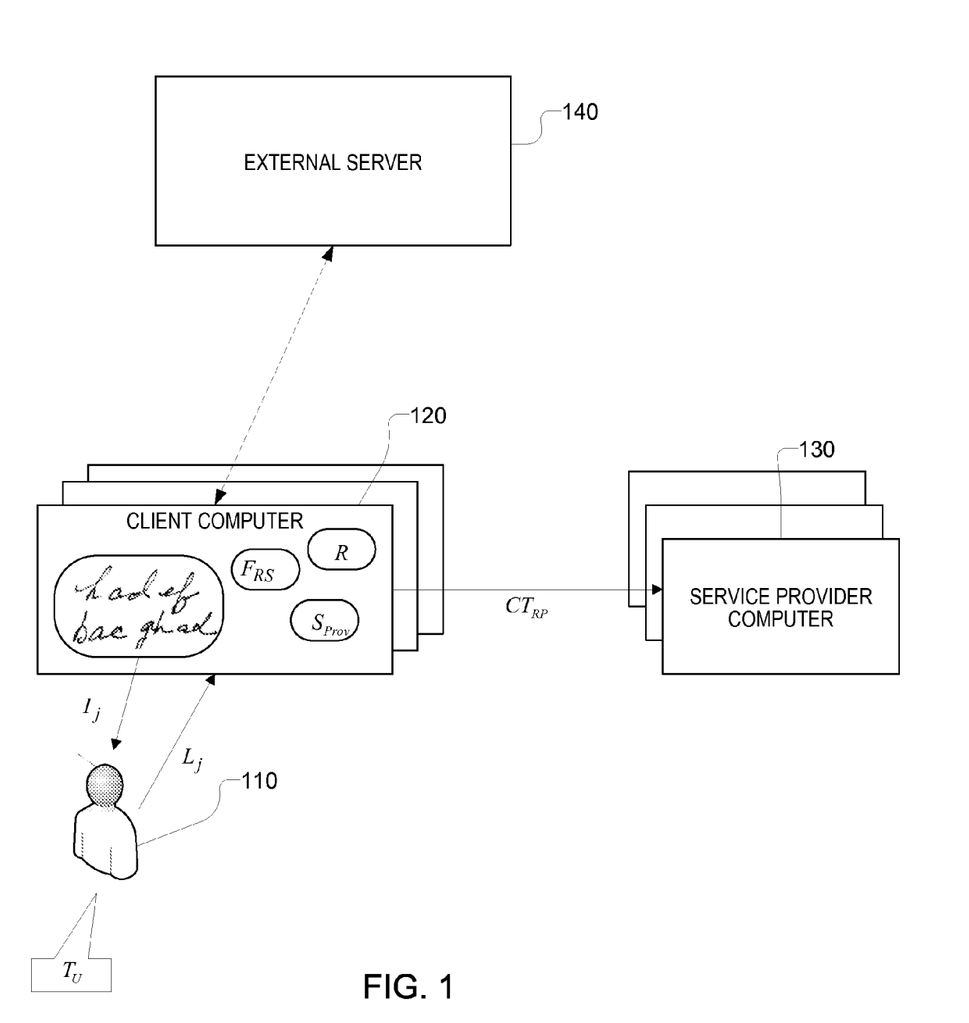
FIG. 1 is a block diagram of a credential control system.

Referring to FIG. 1, in an exemplary embodiment, a number of users 110 make use of services provided by a number of service providers. For example, a single user may make user of a number of different services provided by different service providers, including, for example, separate banking, shopping, and social networking services. Each user has a user computer 120 with which he interacts to accesses the services. Generally, users must provide credentials (e.g., username and password) to each service providers via a service provider computer 130 in order to gain access to the services of that service provider. The discussion below focuses on a single user 110 and user computer 120, but it should be clearly understood that the approach scales to very large numbers of users without adding burden to the service providers.

Figure 2:
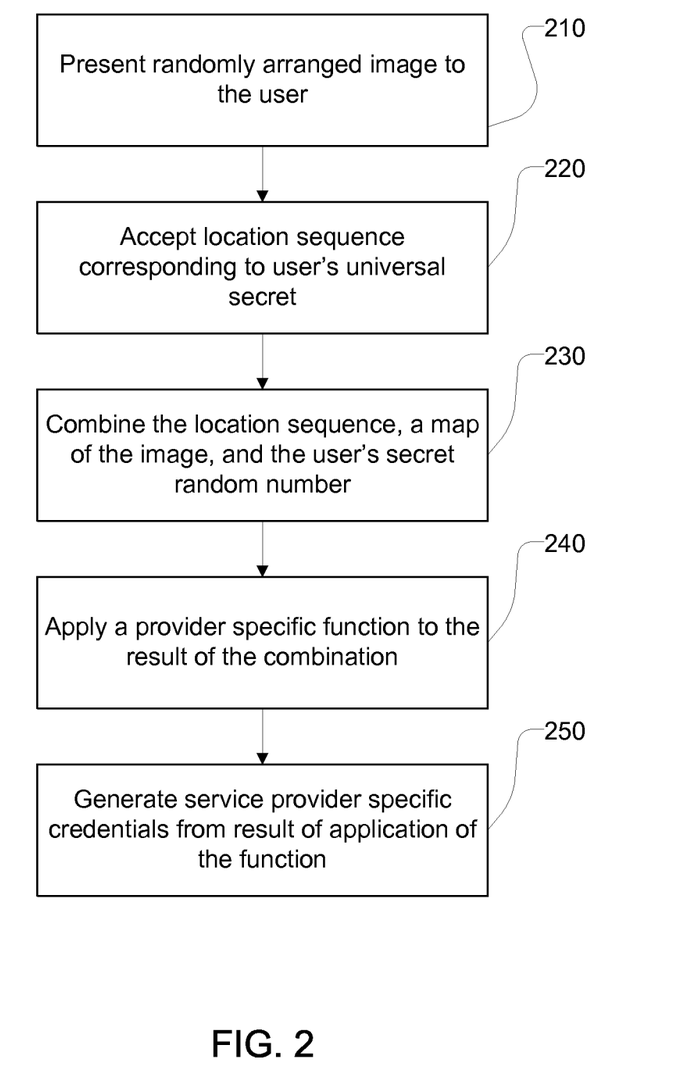
FIG. 2 is a flowchart of a credential generation procedure.

Very generally, in some embodiments, generation of the credentials for a particular user for presentation to a particular service provider involves the following steps, as illustrated in FIG. 2:

A random arrangement of elements is presented in an image ($I_j$) (i.e., the $j^{th}$ image ever presented) to the user (U). For example, the image has distorted characters at different locations in image (block 210);

A location sequence ($L_j$) corresponding to user's universal secret ($T_U$) is accepted from the user. For example, the user uses a mouse or a touch-sensitive screen to spell out his universal secret using the distorted characters in the image (block 220);

The location sequence accepted from the user is combined with a map ($M_j$) of the image ($I_j$) producing a translation (P) of the location sequence, such that this translation is invariant over different images presented to the user (block 230);

The translation (P) and the service provider identifier ($S_{Prov}$) are used to determine a sequence of portions of the user's random number (R), which functions as a user-specific "book" of random numbers. The random numbers in the sequence may be further reduced (e.g., in a service-provider-specific manner) to form the parts of the part of the binary credentials for the service provider. For example, a provider-specific function ($F_{RS}$) is applied to portions of the random number (R) selected according to the identifying quantity for the service provider ($S_{RP}$) and on the translated number (P) to form a binary representation ($CT_{RP}$) of the credentials (block 240); and The credentials ($CT_{RP}$) are formatted (e.g., alphanumeric and special characters that satisfy the requirements of form for that service provider, for instance, at least 8 characters including at least one digit and one punctuation character) and provided to the service provider (block 250).

Note that there are a number of pre-requisites to performing these steps. A first set prerequisite steps are common and are performed before enrolling any particular service provider. These steps include:

The user selects his universal secret ($T_U$) but does not disclose it to anyone or to any computer. Therefore, this secret remains only in the mind of the user at this time.

The user's secret random number (R) is set and stored, in this embodiment, on the user's computer. In some examples, a cryptographically strong random number generator is executed at the external server, and the resulting random number (which may have over $10^5$ or over $10^6$ bits) is securely transferred to the user's computer.

In some embodiments, the external server optionally provides the identifying quantities ($S_{Prov}$) for service providers, for example, being strong random numbers generated by the external server.

A number of steps are performed in enrolling any particular service provider. These steps include:

A service-provider-specific function ($F_{RS}$) is selected at the user's computer, preferably at random from a large set of available function. A characterization of the function is stored at the user's computer in association with an identifier for that service provider.

The steps shown in FIG. 2 are carried out, and the service-provider-specific credentials are provided to the service provider for initial enrollment. For example, a username and password are generated, and used to enroll with the service provider.

Note that the randomly arranged image and corresponding map are such that regardless of the random arrangement of the elements in the image, the translation (P) of the location sequence is the same on each repetition. Because the service-provider specific function is fixed and the arguments to the function are fixed or identically regenerated on each repetition, this means that derived credentials are the same each time the user regenerates them for that service provider.

There are a number of characteristics of this approach that should be noted.

- The user's universal secret ($T_U$) is not stored on any computer at any time.
- Determining the user's universal secret ($T_U$) from the translations (P) requires human interpretation of the image ($I_j$), and knowledge of the map ($M_j$) corresponding to the image.
- Based on the design of the service-provider-specific functions, knowledge of the credentials for one service provider does not allowed determination of the credentials for another service provider.

Below, each of these steps are discussed in detail.

Note that the approach to credential generation is not limited to generating a password for the user. For example, in some examples, the user can also enter a "nickname" for a service provider using such an image-based approach. This can avoid storage of service-provider specific information that could compromise access to the provider. Also, it should be understood that other types of information may be provided by the user such that the service provider obtains the information and a proof that the information was provided by a human while only requiring the single information entry step by the user.

2 Image and Map Generation

Figure 3A:
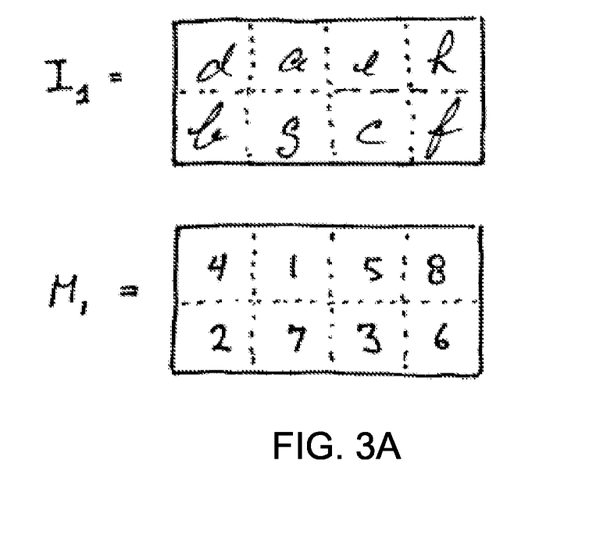
FIGS. 3A-B are illustrations of image/map pairs.

As introduced above, in general, an image presented to a user has a set of characters arranged in a manner that the user can select a sequence of the characters. Referring to FIG. 3A, in an example in which the user's universal secret is represented in the user's mind as a sequence of letters from the set "a" through "f", for example, the word "headache". In this example, a image ($I_1$) includes eight tiles, one tile per letter. The map ($M_1$) provides an index corresponding to each tile. For ease of presentation, in this example, the mapped value for the tile with a rendering of the letter "a" is 1, the tile for "b" is 2, and so forth, but there is no requirement that the letters correspond to indexes in such an ordered manner.

In a subsequent image ($I_j$), the tiles are rearranged (e.g., permuted), but the map ($M_j$) has been similarly rearranged so that that is it consistent with the original image/map pair, and using the same sequence of characters the same sequence of mapped indices is produced.

Therefore, in some embodiments, repeated generation of image/map pairs for a user makes use of knowledge of the original association of characters to mapped indices so that for each new image, a suitable map may be provided. For example, referring to FIG. 1, image/map pairs for a user may be generated by an external server 140 (which is referred to as a "CAPTCHA server" in some implementations), and provided over a secure (e.g., encrypted and authenticated) communication link between the user's computer and the external server. The external server can maintain an original association of characters to indices, for example, originally chosen at random, so that each subsequent map corresponds to the map originally provided to the user. Note that the map may be provided in incremental form (e.g., as a permutation), so that the user can reconstruct the map using the incremental components, but such that an adversary that may gain access to one of the incremental components is unable to reconstruct the map.

Figure 3B:
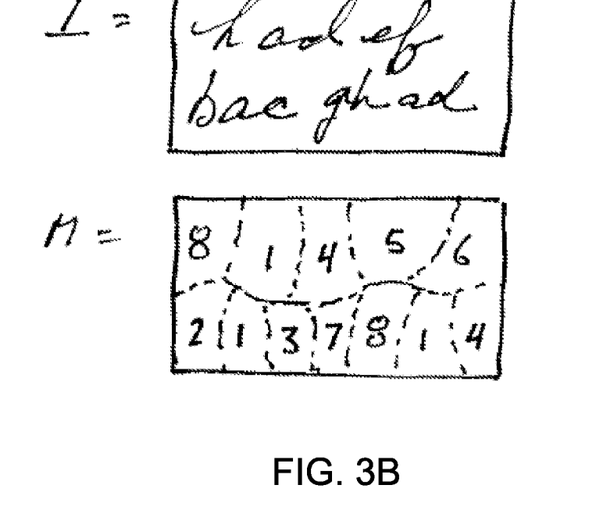

Referring to FIG. 3B, note that characters do not have to be presented on a regular grid. For example, the characters may be distorted across an image, and each pixel may be mapped to an index, for example, forming irregular regions of equal mapped index values.

Furthermore, it should be understood that yet more complex distortions of the characters may be used in some embodiments, for example, with overlapping, variation in color, non-character overlapping graphics, etc. On the other hand, in some embodiments, regular (i.e., "clean") renderings of rearranged square tiles may also be used.

In some examples, the space of images used to represent the user's secret is selected by the user. For example, in an enrollment phase, the user may select a subset of images available to the system. For example, the user may select the subset consisting of upper case roman letters, or may select lower case letter, numbers, logos of sports teams, etc. as the space of images, or any combination. The user selects his secret from this selected domain of images. The image generation process guarantees that at least this subset is presented in each image (thereby guaranteeing that the user can enter his secret), possibly augmented by other images.

3 Location Sequence Entry

When the user is presented with the image, he uses his knowledge of his universal secret to generate a sequence of locations. Each location is passed through the corresponding map to produce a sequence of mapped locations (Q) corresponding to selected locations. For example, for any of the image/map pairs shown in FIGS. 3A-C, when the user selects the locations for the sequence of k=8 characters in the word "headache", the resulting sequence of mapped locations is $$Q=(q_1, \ldots, q_k)=(8,5,1,4,1,3,8,5).$$

In some systems, for example, systems with relatively limited screens, the user can scroll and/or zoom across the image in selecting the successive elements of his universal secret. In some systems, the user may select the elements of his secret out of order, and arrange the order in a separate part of the interface screen (e.g., as an analogy to arranging a set of Scrabble tiles).

4 Location Sequence Translation

In some embodiments, the index sequence Q is used directly to form the translation (P) of the location sequence. For example, with index values in the range $1 \leq q_i \leq 8$ could be translated as $$P=\Sigma_{i=1}^{k}(q_i-1)8^{(i-1)},$$

which for k=8 yields a 24-bit integer.

In some embodiments, a further degree of translation is provided by using an array of random number $r_{q,i}$ where q is over the range of the index map, and i is over the possible length of the user's universal secret. For example, if there are 8 possible characters, and the user's secret is at most 10 characters long, a total of 80 random numbers $r_{q,i}$ are needed. In some examples, this set of random numbers may be provided along with the map, or alternatively may be generated and kept secret by the user. One way of computing the translation (P) using such random numbers is as $$P = \sum_{i=1}^{k} r_{q_i,i} 2^{64(i-1)},$$

which is suitable for 64-bit random numbers, and effectively corresponds to a concatenation of a selection of the user-selected random numbers. Note that effectively, each position q has successive layers of values (e.g., random numbers) "behind" it forming a sequence, and which layer i is used depends on where in the sequence the position is used.

In some examples in which these random numbers are provided along with the map, the function of the map and the random numbers may be combined such that the set of random numbers are permuted in such a way that $\tilde{r}_{l,i} = r_{M(l),i}$ and therefore the translation may be performed in one step as $$P = \sum_{i=1}^{k} r_{l,i} 2^{64(i-1)}$$

In some examples, in order to deal the variable length of user's secrets, the secret may be padded, for example, with index values equal to 0. Similarly, blanks may be allowed in the user's secret by allowing for a space character that maps to a particular index (e.g., 0 as well).

5 Setting of the User's Random Number

Prior to generating any credentials, the a user-specific random (e.g., pseudo-random) number (R) is determined and stored at the user's computer. In general, this random number is relatively long (e.g., thousands or millions of bits long). In some embodiments, the random number is generated by a cryptographically strong pseudo-random number generator at the external server, and transferred to the user's computer. In some embodiments, the number is generated at the user's computer. This random number can be thought of as the user's book of random numbers that is used by functions executing on the user's computer that require generation of pseudo-random numbers. For example, one strong way of generating random numbers is to generate a sequence of offsets into R where to locate portions of the pseudo-random number, for example, where to locate successive bits of the pseudo-random number. Another stronger example is to extract a sequence of bits at each location, and then to apply a reduction function to generate a smaller number of bits (e.g., one bit), generally using a non-invertible function. A yet stronger example, which is described in the context of certain embodiments below, is to select the reduction function itself at random, thereby having three intermixed sources of randomness in the selection of the pseudo-random number: the randomness of R; the randomness of the selection of the location sequence; and the randomness of the selection of the reduction function.

6 Processing to the Translated Sequence

A first step in processing the translation (P) of the user's input is to determine a sequence of subsequences of the bits of the random number R. In some embodiments, the sequence may be chosen to depend of the service provider (e.g., on $S_{PR}$) and a combination (e.g., concatenation) of the selected subsequences (e.g., one or more bits each) could be used as the credentials for that service provider. As introduced above, each subsequence may be optionally reduced by a non-invertible function (e.g., XOR, majority vote, etc.) before being combined. In some such cases, each of these subsequences is passed through a service-provider-specific reduction function to determine a portion of the binary representation of the credentials.

One particular example of this approach uses the translation P, the user's random number R, and an identifier for the service provider $S_{Prov}$ together as a seed for a random number generator. This random number generator is used to generate a sequence of offsets into the user's random number R. For example, if the binary representation of the credentials is to have L bits, a sequence of L offsets are determined this manner. At each offset, a (c+1) length sequence of the random number is extracted and applied as an argument to the service provider specific function $F_{RS}$. In this example, each application of this function yields a single bit of the credentials, which are concatenated to form the overall L bit quantity.

7 Selection of Service-Provide Specific Functions

In some embodiments, the service-provider-specific functions $F_{RS}$ are selected at random from a space of Boolean combinations of the bits of the (c+1) length input sequence. One particular way of selecting such a random function is to generate a c bit random number, and to build a balanced AND/OR c node and c+1 leaf binary tree based on the values. Specifically, each bit position in the c bit random number corresponds to a different node in the tree. Nodes with a 0 bit value perform an AND of the values, and nodes with a 1 bit value perform an OR.

In some embodiments, the c bit random numbers are selected by using a random number generator at the user's computer to generate an offset into the user's random number R, and c bits are read starting at that offset.

Figure 4:
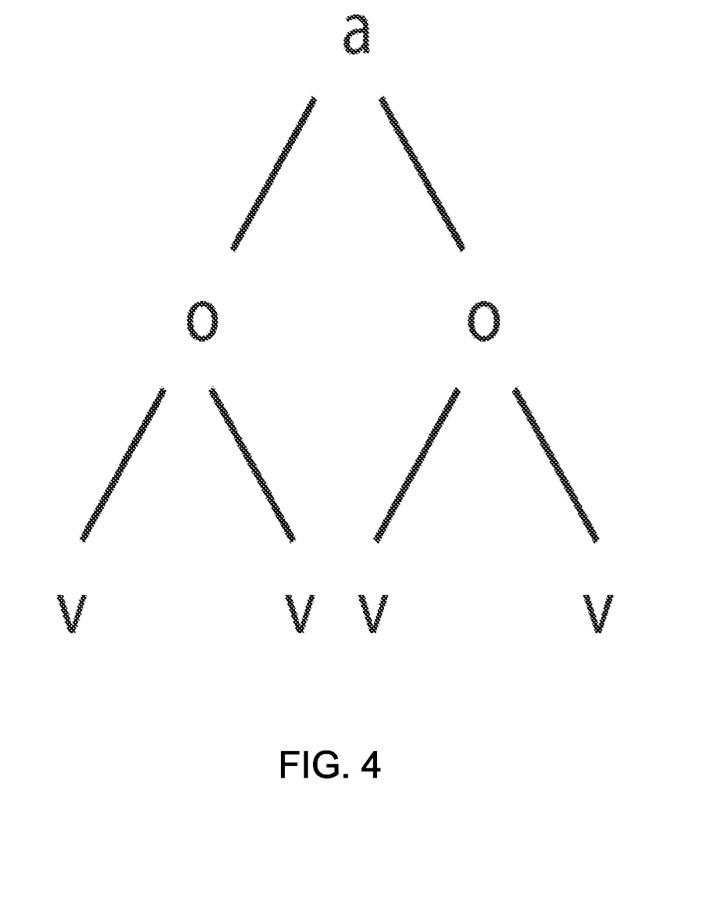
FIG. 4 is a binary AND/OR tree.

Referring to FIG. 4, and example of a (c+1)=4 tree generated with a random number 011 is shown. As examples, this tree produces an output a 1 with an input of 1001 and an output of 0 with an input 1100.

In some embodiments, the space of functions from which the random selection is made is restricted. For example, it is generally desirable that the service-provide function have high uncertainty (entropy) with a random input. As an extreme example, a function determined as a tree of all OR nodes would have very low entropy because the probability of its output being 1 is extremely close to one. Therefore, the random selection of a function includes a test on the probability of the output being 1 with independent inputs each with probability 0.5. If this probability is in the range $0.5 \pm \epsilon$, for example, for $\epsilon = 10^{-3}$, (or alternatively if the entropy is at least $1-\epsilon$ bits), the function is retained, and if not, a new random offset into R is drawn.

Because the user's random number R is already stored at the user's computer, the function is fully characterized by the offset into the random number to configure the function tree.

When a service provider requires that the credentials be changed, for example, because they require that the password be changed every two weeks, this function selection process is repeated. In situations in which some components of the credentials are to be kept constant (e.g., username) and some periodically changed (e.g., password), then multiple separate functions may be associated with a service provider, one for each part of the credentials.

8 Formatting of Credentials for the Service Provider

The above procedure addresses generation of a binary representation of the credentials for a service provider. In practice, many service interfaces require text passwords, for example, restricted to a limited set of characters, for example, upper and lower case letters, digits, and punctuation (e.g., a set of 72 possible characters). Some service providers may only accept capital letters, while others may require at least one punctuation character.

One way to address these constraints is to store a data characterization of the constraints, and to implement a configurable formatting function to transform the binary credentials into appropriately formatted credentials.

In some embodiments, it may be difficult to find such a translation function, and instead, the initial selection of the service-provider specific function ($F_{RS}$) includes a test to ensure that the processing of the user's universal secret yields a suitable formatting. For example, if a password requires at least one punctuation character, at the time that the function is being tested according to its output probability, it may also be tested and possibly rejected according to provider-specific format requirements.

9 Change of a User's Universal Secret

In some situations, the user may wish to change his universal secret without having to provide new credentials to each of service providers. What is needed is that after the change in the user's secret, the translations of the selected locations in an image remain unchanged.

In examples in which the value P is determined using a set of random numbers $r_{q,i}$, one way to accommodate the change in secret is to rearrange these values. For example, if the user initially chose the secret "headache" such that Q=(8, 5, 1, 4, 1, 3, 8, 5), and later wishes to change the secret to "cabbage", which would correspond to Q=(3, 1, 2, 2, 1, 7, 5), a suitable rearrangement of the random number would have $r_{3,1} \leftrightarrow r_{8,1}$, $r_{1,2} \leftrightarrow r_{5,2}, \ldots, r_{5,8} \leftrightarrow r_{5,8}$.

10 Extensions and Optional Features

In some embodiments the external server provides proof to the service provider that the user answered correctly to an image-based challenge. This proof can subsequently be used by the service provider to generate the new credential to the user.

The scheme can also be used to safely store and then recover already existing credentials, passwords and similar secrets (this is important as for example usernames can often not be changed once they have been created). One approach to storage and recovery of such credentials is to form and store transformation data that is used to process the service-provider binary credential to yield the existing value. One example of such transformation data is as a sequence of offsets and lengths of parts of the generated binary credential that are concatenated to form the existing value. These offsets and lengths are determined by a search at an enrollment time. If the value is changed, then the search can be performed again without changing the procedure for generating the binary credential for the service provider. In some examples, rather than forming the existing value directly from the parts of the binary credential, the existing value is first encrypted, and after reconstruction from the parts of the credential decrypted to recover the existing value.

The approaches described above can also be used to obtain one-time passwords to be used on untrusted devices. For example, the user obtains a credential on a trusted device (e.g. mobile phone) to get access to a service provider from an untrusted device (an airport computer terminal). In one implementation the user can sign-in (using the universal secret mechanism) on his trusted device to a web-application of his service provider. This web application solely provides a one-time credential if the sign-in via the universal token mechanism was successful. The user can then use this credential on the untrusted device to get one-time access to the web portal of the e-service provider. In another implementation the external server negotiates one-time credentials with the service providers and then provides one of those to the user. In yet other implementation the previous techniques are combined so that only one-time credentials are used with a service provider: before the user signs out—the next sign-in credential is negotiated between the user's software agent and the service provider. This credential is then stored on the user's computing device, for example, using transformation data as described above for storing existing credentials.

It should also be understood that a number of different components are described above in combination, but that this components may be used independently in other security approaches. An example of this is the use of multiple layers of values "behind" each of a sequence of selection alternative. In an embodiment described above, each location q had a sequence $r_{q,i}$ "behind" it. When the location q is selected in a sequence at the $i^{th}$ point in that sequence, the particular $r_{q,i}$ is used as the translation of that location. Therefore, the same location results in a different translation depending on where it is in the sequence. This same approach may be used in other applications, for example, in translation of keypad input. In an example of such an approach, each key (i.e., 1, 2, . . . , 9, 0) is associated with a sequence of characters (i.e., the $r_{q,i}$). When the user selects a sequence of keys, the selected characters are produced. This makes inversion of the letter sequence to a key sequence difficult. For example, a service provider may provide the letter sequences behind the keys at random whenever the keypad is provided to the user for input.

In another implementation the methods described above can also be used to unlock physical devices like a computer, a smartphone or a door as well as software applications like a key-store. To unlock a device the CAPTCHA server expects to receive a proof that is in part based on a device specific seed $S_{device}$ (e.g. the device serial number, phone number etc.). If the user, using his device, is able to send the proof to the CAPTCHA server, the CAPTCHA server sends in response a command to unlock the device. In this example the CAPTCHA server could be operating either inside or outside the user's device (e.g. a mobile phone, a tablet, etc.) and unlock the device after it received the proof. The CAPTCHA server could also be used to open other devices of the same user (e.g. by using a cable connection, WiFi connection, Bluetooth, etc.).

In a secure key-store implementation after receiving the proof, the CAPTCHA server sends the key to decrypt the credential key-store. In this scenario the CAPTCHA server can always be implemented as a remote server because access to the credential key-store is only useful if there is an active network connection.

It should also be understood that the approaches described above are not strictly limited to "credentials" is a narrow sense of the word. The user can provide various forms of identifying, verifying, and/or functional information in the same manner in which he provides his universal secret, and through one action by the user, the service provider can obtain the information and the proof that a human provided the information.

11 Implementation Alternatives

In some implementations, the steps described above are all carried out on the user's computing device (including smartphones and tablets), and the user's random number and characteristics of the service-provider-specific functions are all stored on that computer.

In some implementations, some steps are segregated from other parts. One way to segregate the parts is with a software based segregation. For example, the image and map may be provided from the external server is a secure "wrapper" such that it is difficult for an adversary to access the image and the processing to produce the translation P. For example, these parts may be provided in an Adobe Flash media or HTML 5 format. Another way to segregate this part of the processing is to provide the image and map to a separate device for the user, for example, to a user's smartphone, and only provide the translation P from the smartphone to the user's computer.

In some implementations, the use of the random image is not required. For example, a fixed keypad may be provided to the user and the translation P based on a secret set of random numbers embedded in the keypad is provided based on the user's input. In some implementations, such a keypad may have programmable labels, allowing for the permutation of the locations for each use.

Input of the locations by the user can make use of various devices. For example, a mouse, a touch sensitive screen, a trackball, cursors, or eye tracker may be used to determine the locations entered by the user. Because a keyboard is not necessarily used, key loggers may not be effective against this type of input.

Various types of integration may be used. For example, some service providers may have an interface that directly communicates with software on the user's computer to accept binary credentials without formatting. In some examples, the software on the user's computer can emulate typing by the user to enter a password, or may emulate a Web form filling to send (e.g., http POST) form data that contains the credentials. In some examples, the formatted credentials are put on a software clipboard, and the user pasts them into the required parts on a service provider interface.

It should also be understood that a user is not limited to a single credential for each service provider. For example, the user may have multiple personalities on a social networking service, each with it's own nickname and password. Furthermore, in some implementations, the generated credentials include an email alias that is forwarded by an anonymizing service to the user. For example, when a service provider requires a unique email address by which to identify and communicate with the user, the approach can be used to generate such an alias, which is then registered with an email forwarding service.

The credentials can include a wide range of identity attributes for the user. For example, some providers require a birthday, which could be generated for the user by the system (i.e., so that the user's real birthdate does not have to be disclosed).

It should also be recognized that the external server is not required. For example, the images and corresponding maps may be generated on the user's computer, on an attached device (e.g., a smartphone), or at the service provider.

Implementations may includes software with instructions for controlling a physical or virtual machine (e.g., a Java VM), and these instructions may be stored on a machine readable medium, for example, at the user's computer or for transmission to the user's computer.

It is to be understood that the foregoing description is intended to illustrate and not to limit the scope of the invention, which is defined by the scope of the appended claims. Other embodiments are within the scope of the following claims.

What is claimed is:

1. A method for generating a recipient-specific credential based on a user's secret using a computing device of a user, the method comprising:
   receiving an image-based challenge and associated mapping data from an external server;
   providing the image-based challenge for presentation to the user on an electronic display, the image-based challenge comprising a spatial arrangement of a set of perceptually obscured symbols;
   accepting a response entered by the user via an input device and determined by the user based on the user's secret and the challenge, the response being based on a sequence of locations in the spatial arrangement;
   determining an identifier of the recipient;
   accessing from a data storage a user-specific predetermined random number;
   applying a computer-implemented credential-generating procedure to combine the mapping data, the response from the user, the identifier for the recipient, and the user-specific predetermined random number to form the recipient-specific credential without exposing the user's secret, including combining the mapping data with the response from the user to determine a mapped response and preventing disclosure of the user's secret internally on the computing device of the user; and
   providing the recipient-specific credential for transmission to the recipient without providing information sufficient to determine the user's secret from the transmission.

2. The method of claim 1 wherein providing the recipient-specific credential serves as providing a proof that the user that determined the response is a human knowing the user's secret.

3. The method of claim 1 wherein the recipient is a service provider and providing the recipient-specific credential includes providing said recipient-specific credential over a data communication link to the service provider.

4. The method of claim 1 wherein providing the recipient-specific credential includes providing said recipient-specific credential for access to a secure physical device or a software application.

5. The method of claim 1 wherein applying the credential-generating procedure includes selecting portions of a user's fixed random number and combining the selected portions, and preferably includes applying a reduction function to each portion and combining the reduced portions.

6. The method of claim 1 wherein the spatial arrangement comprises a grid based arrangement.

7. The method of claim 1 wherein the spatial arrangement comprises an irregular two-dimensional arrangement.

8. The method of claim 7 wherein the irregular two-dimensional arrangement includes at least some overlapping of perceptually obscured representations of multiple of the symbols.

9. The method of claim 1 further comprising modifying the credential generating procedure according to a change of the user's secret.

10. The method of claim 1
    wherein combining the mapping data, the response from the user and the identifier for the recipient comprises combining the mapped response and the identifier for the recipient.

11. The method of claim 1 wherein the steps of claim 1 are repeatable using a plurality of different image-based challenges to the user yielding a plurality of different responses from the user determined by using the same user's secret such that the recipient-specific credential remains the same for each repetition.

12. The method of claim 1 wherein the image-based challenge is specific to the recipient.

13. The method of claim 12 wherein the method further comprises receiving the image-based challenge from the recipient prior to presentation to the user.

14. The method of claim 1 wherein applying the credential-generating procedure is performed at the computing device of the user without disclosing the user's response or the user's secret from said computing device.

15. The method of claim 1 wherein forming the recipient-specific credential without exposing the user's secret includes forming a pseudo-random number that depends on each of the response from the user, the identifier for the recipient, and the user-specific predetermined random number.

16. A computer program product embodied on a non-transitory computer-readable medium comprising instructions for providing a recipient-specific credential based on a user's secret that when executed by a processor causes a computing device of a user to:

receive an image-based challenge and associated mapping data from an external server;

provide an image-based challenge for presentation to the user on an electronic display, the image-based challenge comprising a spatial arrangement of a set of perceptually obscured symbols;

accept a response entered by the user via an input device determined by the user based on the user's secret and the challenge, the response being based on a sequence of locations in the spatial arrangement;

determine an identifier of a recipient;

access from a data storage a user-specific predetermined random number;

apply a credential-generating procedure to combining the response from the user, the identifier for the recipient, and the user-specific predetermined random number to form the recipient-specific credential without exposing the user's secret; and     provide the recipient-specific credential for transmission to the recipient without providing information sufficient to determine the user's secret in the transmission.

17. The computer program product of claim 16 wherein forming the recipient-specific credential without exposing the user's secret includes preventing disclosure of the user's secret on the computing device of the user.

18. A computer-implemented system for providing a recipient-specific credential based on a user's secret using a computing device of a user comprising:

a software controlled component, comprising a hardware processor, configured to     receive an image-based challenge and associated mapping data from an external server;

provide the image-based challenge to the user, the challenge comprising a spatial arrangement of a set of perceptually obscured symbols;

accept a response from the user determined by the user based on the user's secret and the challenge, the response being based on a sequence of locations in the spatial arrangement;

determine an identifier of a recipient;

access from a data storage a user-specific predetermined random number;

apply a credential-generating procedure to combining the mapping data, the response from the user, the identifier for the recipient, and the user-specific predetermined random number to form the recipient-specific credential without exposing the user's secret, including combining the mapping data with the response from the user to determine a mapped response and preventing disclosure of the user's secret internally on the computing device of the user; and     provide the recipient-specific credential for transmission to the recipient without providing information sufficient to determine the user's secret in the transmission.

\* \* \* \* \*